United States Patent
Park et al.

(10) Patent No.: US 7,881,080 B2
(45) Date of Patent: Feb. 1, 2011

(54) APPARATUS AND METHOD FOR CONTROLLING INVERTER

(75) Inventors: Sung-Min Park, Gyeonggi-Do (KR); Tae-Kyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 489 days.

(21) Appl. No.: 12/088,542

(22) PCT Filed: Dec. 28, 2006

(86) PCT No.: PCT/KR2006/005811

§ 371 (c)(1),
(2), (4) Date: Mar. 28, 2008

(87) PCT Pub. No.: WO2007/078105

PCT Pub. Date: Jul. 12, 2007

(65) Prior Publication Data
US 2008/0225561 A1    Sep. 18, 2008

(30) Foreign Application Priority Data
Dec. 30, 2005 (KR) .................. 10-2005-0136046

(51) Int. Cl.
*H02M 1/12* (2006.01)
*H02M 1/14* (2006.01)
(52) U.S. Cl. .................. 363/41; 363/95; 363/97; 363/98; 363/131; 363/132
(58) Field of Classification Search .......... 363/41, 363/95, 97, 98, 131, 132
See application file for complete search history.

(56) References Cited

U.S. PATENT DOCUMENTS

| | | | |
|---|---|---|---|
| 6,023,417 A | * | 2/2000 | Hava et al. .......... 363/41 |
| 6,424,113 B1 | * | 7/2002 | Kelly et al. .......... 318/599 |
| 6,804,130 B2 | | 10/2004 | Morimoto |
| 6,984,953 B2 | * | 1/2006 | Quirion et al. .......... 318/400.3 |
| 7,031,172 B2 | | 4/2006 | Tanaka et al. |
| 2004/0144776 A1 | | 7/2004 | Han et al. |
| 2004/0189316 A1 | | 9/2004 | Kim |

(Continued)

FOREIGN PATENT DOCUMENTS

JP    2002-34289    1/2002

(Continued)

OTHER PUBLICATIONS

English language Abstract of KR 10-2005-0027767, Mar. 21, 2005.

(Continued)

*Primary Examiner*—Bao Q Vu
(74) *Attorney, Agent, or Firm*—Ked & Associates, LLP

(57) ABSTRACT

An apparatus and method for controlling an inverter capable of enhancing reliability of current measurement by ensuring an optimal time for which effective voltage vectors are applied to detect a three-phase current according to a phase current and sizes of the effective voltage vectors, the apparatus comprising a space voltage modulator that generates and outputs effective voltage vectors based upon a voltage command value, and a low modulation determiner that determines whether the effective voltage vectors are located within a low modulation region, and outputs a low modulation switching control signal or a normal modulation switching control signal according to the determination.

24 Claims, 5 Drawing Sheets

U.S. PATENT DOCUMENTS

2004/0195995 A1* 10/2004 Quirion et al. .............. 318/811
2005/0099743 A1   5/2005 Lee
2005/0121442 A1   6/2005 Shin
2007/0227821 A1  10/2007 Park et al.

FOREIGN PATENT DOCUMENTS

JP    2004-23809        1/2004
KR    10-2004-0084082  10/2004
KR    10-2005-0027767   3/2005

OTHER PUBLICATIONS

English language Abstract of JP 2002-34289, Jan. 31, 2002.
English language Abstract of JP 2004-23809, Jan. 22, 2004.
English language Abstract of KR 10-2004-0084082, Oct. 6, 2004.

* cited by examiner (a)

(b)

APPARATUS AND METHOD FOR CONTROLLING INVERTER

BACKGROUND OF THE INVENTION

1. Field of the Invention

The present invention relates to an apparatus and method for controlling an inverter, and particularly, to an apparatus and method for controlling an inverter capable of enhancing reliability of measurement of a phase current even in a case where a time for which effective voltage vectors are applied is within a low modulation region as well as within a regular region.

2. Background of the Invention

Development of power semiconductor technologies and control technologies has allowed frequencies and voltages to be consecutively varied. Accordingly, a pulse width modulation (PWM) technique is greatly being used for adjusting speed in an alternating current (AC) system.

Specifically, attention is being given to a method for controlling an inverter adapting a PWM technique which modulates a space voltage vector. The PWM technique for modulating the space voltage vector can greatly control a high frequency current element in a normal state as compared to a commonly-used PWM technique for comparing triangular waves.

In the PWM technique for modulating the space voltage vector, gating signals can appropriately be generated according to sectors only after a reversely-converted actual switching time is calculated based on a time for which effective voltage vectors are applied according to the location of a reference voltage vector and on the location of the reference voltage vector.

In an inverter system using a single current sensor, restoring a phase current from a DC-link current sensor may be available only when there is provided a time enough to sample two effective vectors.

That is, one of the two effective voltage vectors is used to restore one phase current, and the other effective voltage vector is used to construct another phase current. As such, there may occur a problem in that the effective voltage vectors must be applied for a minimum time in order to obtain a reliable phase current.

In general, the minimum time for which the effective voltage vectors should be applied can be calculated by using Equation (1) as follows.

$$T_{min} = T_{dead} + T_{sett} + T_{AD} \quad (1)$$

Here, $T_{dead}$ denotes a dead time, $T_{sett}$ denotes a stabilization time of a DC link ringing current generated due to switching, and $T_{AD}$ denotes an A/D conversion time.

FIG. 1 illustrates a method for measuring a phase current in case where effective vectors are located in a low modulation region according to the related art.

As illustrated in FIG. 1, the related art adapts a method in which a time for which the effective voltage vectors are applied is forcibly extended when values of T1/2 and T2/2 each obtained by use of a space voltage vector are smaller than a minimum time $T_{min}$ for restoring current.

In particular, a low-modulation region in which T1/2 and T2/2 are smaller than the minimum time $T_{min}$ at a time of starting (activating) an inverter system or during its low speed driving.

Accordingly, the related art, as aforementioned, uses the method for forcibly extending the applying time in order to measure the current.

However, in the related art, if the time for which the space voltage vector is applied is forcibly extended, errors of the space voltage vector may be generated. The errors of the space voltage vector may then occur distortion of the space voltage vector, which results in degradation of reliability of the normal low speed driving or reliability of the activation.

SUMMARY OF THE INVENTION

Therefore, an object of the present invention is to provide an apparatus and method for controlling an inverter capable of enhancing reliability of current measurement by ensuring an optimal time for which effective voltage vectors are applied to detect a three-phase current according to a phase current and sizes of the effective voltage vectors.

To achieve these and other advantages and in accordance with the purpose of the present invention, as embodied and broadly described herein, there is provided an apparatus for controlling an inverter comprising: a space voltage modulator that generates and outputs effective voltage vectors based upon a voltage command value; and a low modulation determiner that determines whether the effective voltage vectors are located in a low modulation region and outputs a low modulation switching control signal or a normal modulation switching control signal according to the result of the determination.

In another embodiment of the present invention, there is provided an apparatus for controlling an inverter comprising: a space voltage modulator that generates and outputs effective voltage vectors based upon a voltage command value; a low modulation determiner that determines whether the effective voltage vectors are located in a low modulation region and outputs a low modulation switching control signal or a normal modulation switching control signal according to the result of the determination; a switching signal generator that generates a switching signal to control activation and low speed driving based upon the low modulation switching control signal, and generates a switching signal to control a normal driving based upon the normal modulation switching control signal; and an inverter that is switched by the switching signals and outputs a phase voltage and a phase current according to the result of the switching.

To achieve these and other advantages and in accordance with the purpose of the present invention, there is provided a method for controlling an inverter comprising: generating effective voltage vectors based upon a voltage command value; and determining whether the generated effective voltage vectors are located in a low modulation region to thus perform a low modulation or a normal modulation for an input voltage according to the determination.

In another embodiment of the present invention, there is provided a method for controlling an inverter comprising: generating a current command value according to a load, obtaining a difference value between the current command value and an actual current restored, and thereby generating a voltage command value based upon the difference value; generating effective voltage vectors based upon the voltage command value; determining whether the generated effective voltage vectors are located in a low modulation region to thereby perform a low modulation or normal modulation for an input voltage according to the determination; and detecting a phase current outputted from an inverter depending on the low modulation or normal modulation to then restore an actual current from the detected phase current.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail, with reference to FIGS. 2 to 6, an apparatus and method for controlling an inverter according to the present invention capable of detecting a phase current by outputting a low modulation switching control signal even in case where effective voltage vectors are in a low modulation region at a time of activation or during a low speed driving, and also capable of reducing noise generated when switching a motor in case where effective voltage vectors are shifted to a middle portion of a switching signal period by a low modulation switching signal generator.

Figure 1:
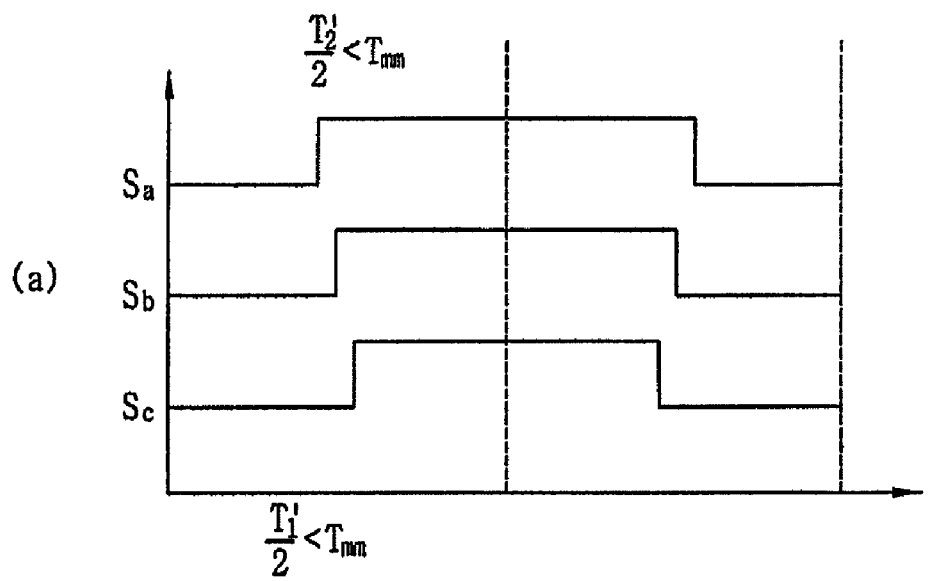
FIG. 1 illustrates a method for measuring a phase current in case where effective vectors are located in a low modulation region according to the related art.
Figure 1:
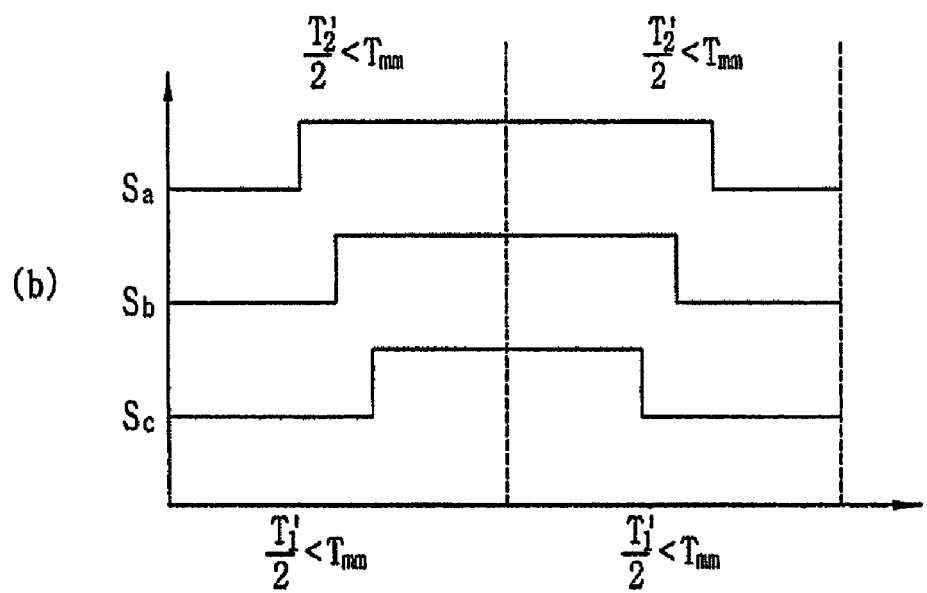
Figure 2:
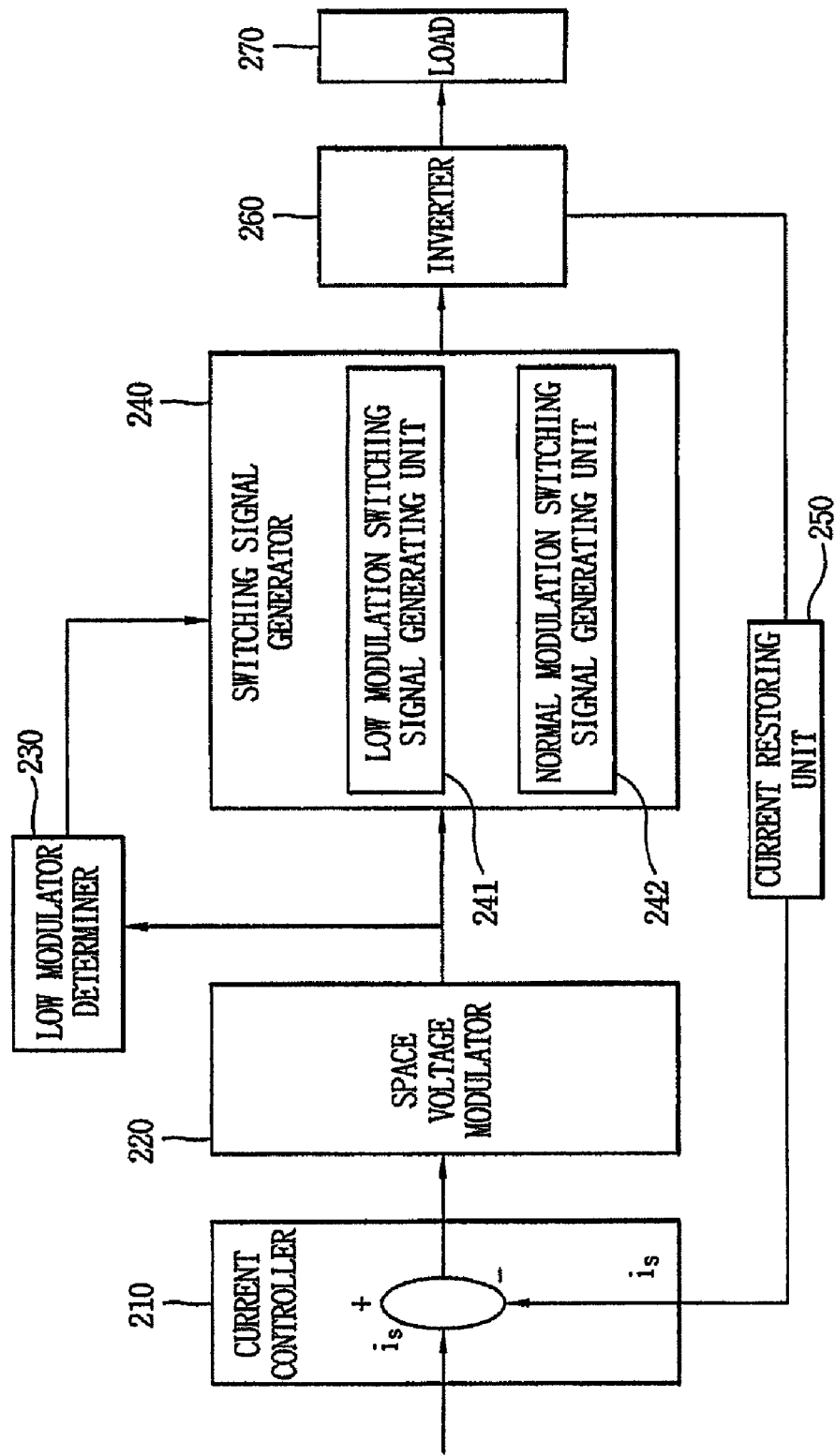
FIG. 2 is a block diagram illustrating a configuration of an inverter controlling apparatus in accordance with an embodiment of the present invention.
Figure 3:
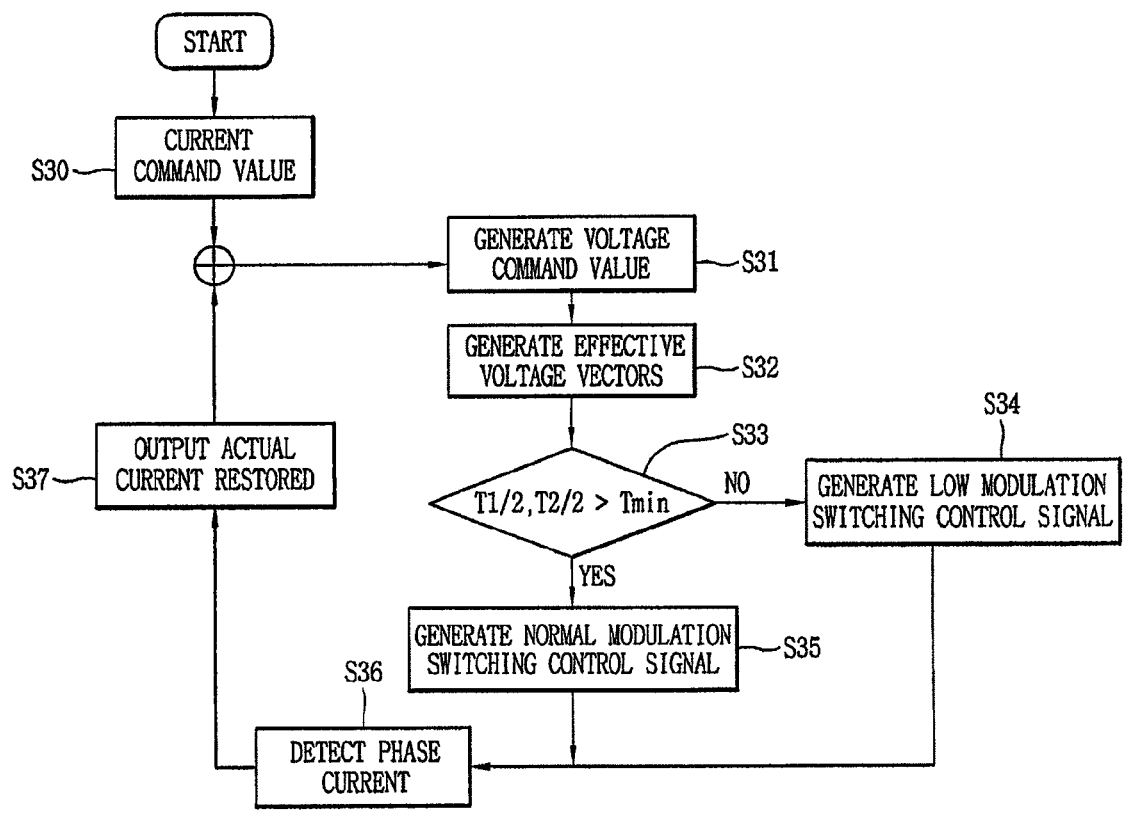
FIG. 3 is a flowchart illustrating operations of the inverter controlling apparatus in accordance with the embodiment of the present invention.

FIG. 2 is a block diagram illustrating a configuration of an apparatus for controlling an inverter to measure a reliable phase current in accordance with an embodiment of the present invention.

As illustrated in FIG. 2, an apparatus for controlling an inverter according to the present invention includes a current restoring unit 250, a current controller 210, a space voltage modulator 220, a low modulation determiner 230, a switching signal generator 240, an inverter 260, and a load 270.

The current controller 210 obtains (calculates) a difference value between a current command value inputted from the exterior and an actual current restored, and generates a voltage command value corresponding to the difference value.

The space voltage modulator 220 generates effective voltage vectors T1 and T2 for determining a switching time of the inverter 260 according to the voltage command value generated by the current controller 210.

The low modulator determiner 230 determines whether the effective voltage vectors T1 and T2 outputted from the space voltage modulator 220 are located in a low modulation region, and then outputs a low modulation switching control signal or a normal modulation switching control signal.

Here, the low modulation determiner 230 outputs the low modulation switching control signal when the effective voltage vectors T1 and T2 are located in the low modulation region, while outputting the normal modulation switching control signal when the effective voltage vectors T1 and T2 are located in a normal region.

The switching signal generator 240 generates a switching signal for controlling activation or low speed driving according to the low modulation switching control signal, while generating another switching signal for controlling a normal driving according to the normal modulation switching control signal.

Here, the switching signal generator 250 is provided with a low modulation switching signal generating unit 241 and a normal modulation switching signal generating unit 242.

In the aspect of the present invention, according to the low modulation switching control signal, the switching signal generator 250 generates signals for conducting phases synchronized with each other within a half period of a certain time Ts and also applies a zero voltage at the rest half period, to thereafter generate a switching signal by shifting the signals for conducting each of the phases to the half period of the zero voltage being applied by a certain level.

The inverter 260 is switched by the switching signals, and outputs a phase voltage and a phase current according to the result of the switching.

The current restoring unit 250 detects a phase current of the load 270 to restore an actual current from the detected phase current, and thereafter outputs the restored actual current to the current controller 210.

That is, the current restoring unit 250 detects an actual current of a certain phase outputted from the inverter 260.

Hereinafter, operations of the apparatus and method for controlling the inverter in accordance with the embodiment of the present invention will now be explained in detail.

First, it is assumed that the load 270 is being driven by a certain current command value by a certain speed (S30).

The current restoring unit 250 detects a phase current of the load 270 and restores an actual current from the detected phase current, thereby outputting the restored actual current (S36 and S37).

Next, the current controller 210 compares the actual current value restored by the current restoring unit 250 with a current command value generated by interworking with the load 270, and then generates and outputs a voltage command value based upon the comparison (S31).

The space voltage modulator 220 generates and outputs effective voltage vectors T1 and T2 for determining a switching time of the inverter 260 based upon the voltage command value (S32).

The low modulation determiner 230 outputs a low modulation switching control signal for normally driving the load 270 if the effective voltage vectors T1 and T2 are determined to be located within a low modulation region, while outputting a normal modulation switching control signal when the effective voltage vectors T1 and T2 are determined to be located within a normal region (S33).

Here, the low modulation region indicates a region in which a phase current can reliably be detected, the region in which the effective voltage vectors T1 and T2 are smaller than a minimum effective voltage vector $T_{min}$ for allowing a reliable phase current detection, which means that a motor can not normally be driven in the low modulation region according to the related art.

The normal modulation switching generating unit 242 generates and outputs a normal switching signal for the normal driving of the load 270 according to the normal modulation switching control signal (S35).

The low modulation switching signal generating 241 generates and outputs a low modulation switching control signal for controlling activation or low speed driving of the load 270 according to the low modulation switching control signal (S34).

Hereinafter, a process of generating the low modulation switching signal will be explained in detail with reference to FIG. 4.

Figure 4:
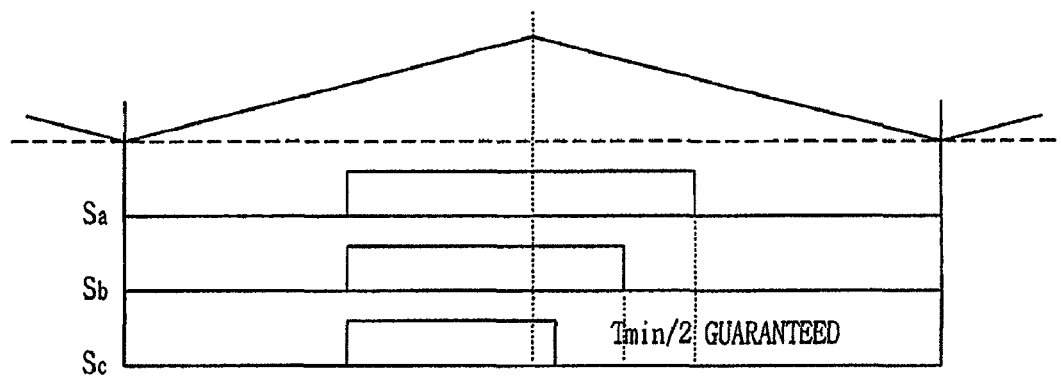
FIG. 4 is a waveform view of a low modulation switching signal in the inverter controlling apparatus in accordance with the embodiment of the present invention.

FIG. 4 is a waveform view illustrating a low modulation switching signal of an inverter controlling apparatus in accordance with an embodiment of the present invention.

In a state that the effective voltage vectors T1 and T2 are located in the low modulation region, the low modulation switching signal generating unit 241, as shown in FIG. 4, generates a new switching signal by entirely applying, only within a half switching period, the effective voltage vectors T1 and T2 of each switching signal synchronized with each other, and also applying a zero voltage within the rest half period, instead of using T1/2 and T2/2 corresponding to halves of the effective voltage vectors T1 and T2. The low modulation switching signal generating unit 241 then outputs a low modulation switching signal which is obtained by shifting the effective voltage vectors T1 and T2 of the generated switching signal to a certain time of the rest half period.

That is, the low modulation switching signal generating unit 241 generates a switching signal by generating signals for conducting phases synchronized with each other within a half period of a certain time Ts according to the low modulation switching control signal and applying a zero voltage within the rest half period, so as to generate a low modulation switching signal by shifting the signals for conducting each of the phases of the generated switching signal to the rest half period in which the zero voltage has been applied for a certain time.

Therefore, in the present invention, since the low modulation region in which a current can not be measured according to the related art is reduced in half, a reliable phase current can be restored even in the low modulation region. Also, the effective voltage vectors are shifted to the middle portion of a switching signal period, which results in a reduction of noise generated when switching a motor.

More specifically, assuming that a minimum effective voltage vector $T_{min}$ is 100 and the effective voltage vectors T1 and T2 are 100, respectively, T1/2 and T2/2 each of which is a time in which the current can be measured, are respectively reduced by 50 in the related art to thereby be smaller than the time (i.e., 100) required for the current measurement. Accordingly, the current can not be measured.

However, the present invention uses the effective voltage vectors T1 and T2 only within a half period. Accordingly, the time for which the current can be measured may correspond to the effective voltage vectors T1 and T2, other than the halves of the effective voltage vectors T1/2 and T2/2. Therefore, the present invention can measure the normal phase current by applying the time (i.e., 100) for which the current can be measured.

Figure 5:
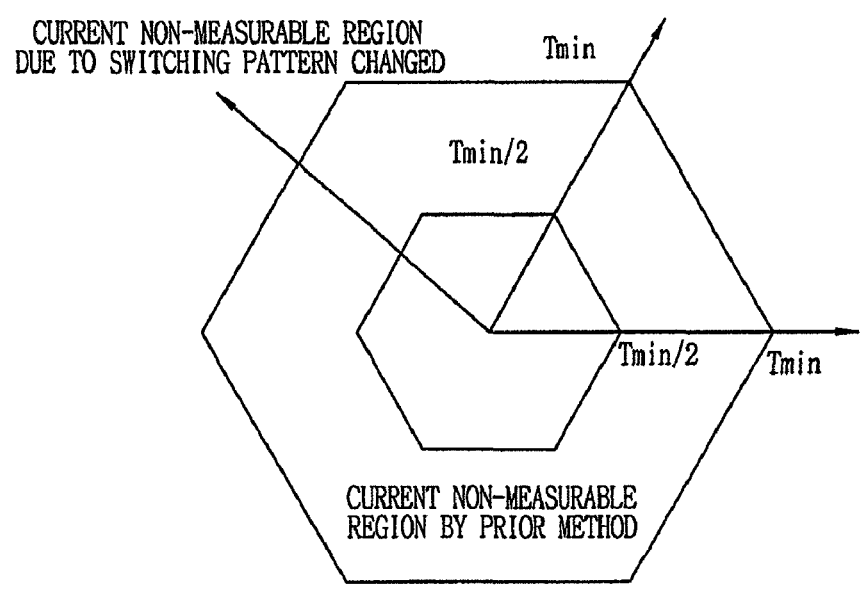
FIG. 5 illustrates a view of a space voltage vector in which current-measurable regions are indicated in case of using the inverter controlling apparatus in accordance with the embodiment of the present invention.
Figure 6:
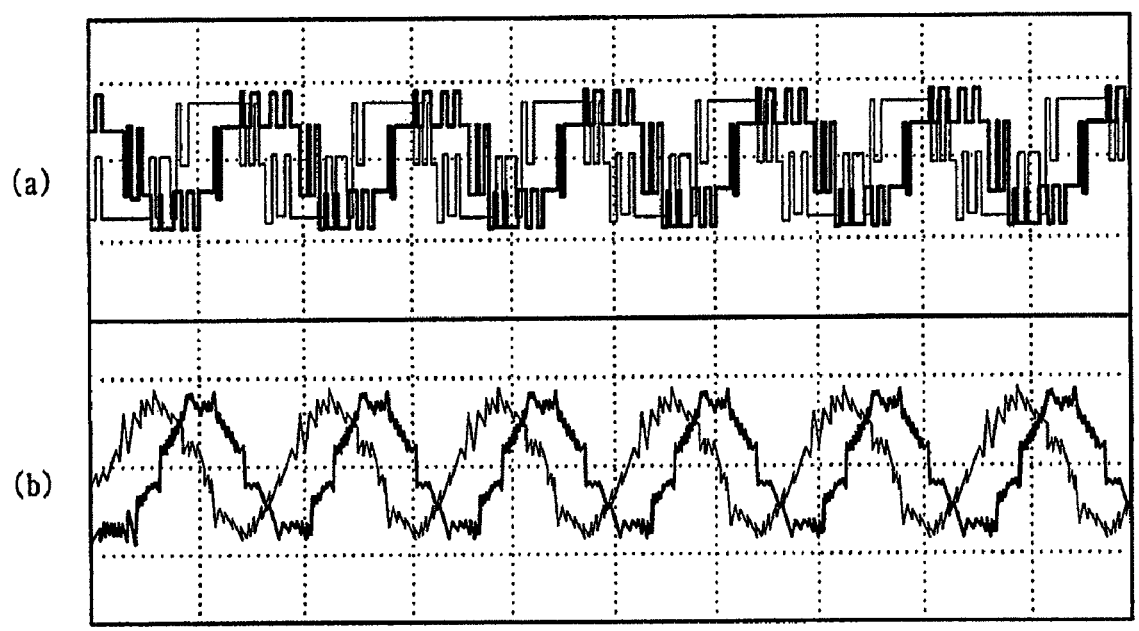
FIG. 6 is a waveform diagram of a phase voltage in case of using the inverter controlling apparatus in accordance with the embodiment of the present invention.

That is, as illustrated in FIG. 5, an apparatus for controlling an inverter in accordance with an embodiment of the present invention uses greater effective voltage vectors that the related art apparatus for controlling an inverter, thus to increase a region in which the current can be measured.

In addition, when using the apparatus for controlling the inverter in accordance with the embodiment of the present invention, waveforms of phase voltages of D-axis and Q-axis outputted to the load at low speed, as illustrated in FIG. 6(b), are more similar to sine waves which are phase voltage waveforms obtained by appropriately controlling the inverter, as compared to the phase voltage waveforms in the related art as illustrated in FIG. 6(a).

As described above, the apparatus and method for controlling the inverter according to the present invention can enhance reliability of the current measurement by guaranteeing the optimal time for which the effective voltage vectors are applied to detect a three-phase current according to the phase current and the effective voltage vectors.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for controlling an inverter comprising:
   a space voltage modulator that generates and outputs effective voltage vectors based upon a voltage command value; and
   a low modulation determiner that determines whether the effective voltage vectors are located within a low modulation region, and outputs a low modulation switching control signal or a normal modulation switching control signal according to the determination.

2. The apparatus of claim 1, wherein the low modulation determiner outputs the low modulation switching control signal when the effective voltage vectors are within a low modulation region, and outputs the normal modulation switching control signal when the effective voltage vectors are in a normal region.

3. The apparatus of claim 1, further comprising:
   a switching signal generator that generates a switching signal for controlling an activation or a low speed driving according to the low modulation switching control signal, and generates another switching signal for controlling a normal driving according to the normal modulation switching control signal.

4. The apparatus of claim 3, further comprising:
   an inverter that is switched by the switching signals, and outputs a phase voltage and a phase current according to the result of the switching.

5. The apparatus of claim 1, further comprising:
   a current restoring unit that detects the phase current to restore an actual current from the detected phase current.

6. The apparatus of claim 1, further comprising:
   a current controller that outputs a voltage command value based on a difference value between a current command value interworked with a load and the actual current value restored.

7. The apparatus of claim 3, wherein the switching signal generator generates signals for conducting phases synchronized with each other within a half period of a certain time and applies a zero voltage within the rest half period, to thereby generate a switching signal by shifting the signals for conducting each of the phases, by a certain level, to the rest half period in which the zero voltage has been applied.

8. An apparatus for controlling an inverter comprising:
   a space voltage modulator that generates and outputs effective voltage vectors based on a voltage command value;
   a low modulation determiner that determines whether the effective voltage vectors are located in a low modulation region, and outputs a low modulation switching control signal or a normal modulation switching control signal according to the determination;

a switching signal generator that generates a switching signal for controlling an activation or a low speed driving according to the low modulation switching control signal, and generates another switching signal for controlling a normal driving according to the normal modulation switching control signal; and an inverter that is switched by the switching signals, and outputs a phase voltage and a phase current according to the result of the switching.

9. The apparatus of claim 8, further comprising:

a current restoring unit that detects the phase current and restores an actual current from the detected phase current.

10. The apparatus of claim 8, further comprising:

a current controller that outputs a voltage command value based on a difference value between a current command value interworked with a load and the actual current value restored.

11. The apparatus of claim 8, wherein the low modulation determiner outputs a low modulation switching control signal when the effective voltage vectors are located in a low modulation region, and outputs a normal modulation switching control signal when the effective voltage vectors are located in a normal region.

12. The apparatus of claim 8, wherein the switching signal generator generates signals for conducting phases synchronized with each other within a half period of a certain time and applies a zero voltage within the rest half period, to thereby generate a switching signal by shifting the signals for conducting each of the phases, by a certain level, to the rest half period in which the zero voltage has been applied.

13. A method for controlling an inverter comprising:

generating effective voltage vectors based on a voltage command value; and determining whether the generated effective voltage vectors are located within a low modulation region and performing a low modulation or a normal modulation for an input voltage according to the determination.

14. The method of claim 13, wherein performing the low modulation or the normal modulation includes:

performing the low modulation for the input voltage applied to an inverter when the effective voltage vectors are located within the low modulation region; and performing the normal modulation for an input voltage applied to the inverter when the effective voltage vectors are located within a normal region.

15. The method of claim 14, wherein performing the low modulation includes:

generating a low modulation switching control signal when the effective voltage vectors are located within the low modulation region, and then generating a switching signal for controlling an activation and a low speed driving based on the generated low modulation switching control signal; and switching the inverter by the generated switching signal, and performing the low modulation for the input voltage applied to the inverter according to the result of the switching.

16. The method of claim 15, wherein generating the switching signal includes:

generating signals for conducting phases synchronized with each other within a half period of a certain time and applying a zero voltage within the rest half period according to the low modulation switching control signal; and generating a switching signal by shifting the signals for conducting each of the phases by a certain level to the rest half period in which the zero voltage has been applied.

17. The method of claim 14, wherein performing the normal modulation includes:

generating the normal modulation switching control signal when the effective voltage vectors are located within the normal modulation region, and generating a switching signal for controlling an activation and a low speed driving according to the generated normal modulation switching control signal; and switching the inverter by the generated switching signal, and performing the normal modulation for the input voltage applied to the inverter according to the result of the switching.

18. The method of claim 13, further comprising:

detecting a phase current outputted from the inverter according to the low modulation or normal modulation, and restoring an actual current from the detected phase current.

19. The method of claim 13, further comprising:

generating a current command value according to a load and calculating a difference value between the current command value and the actual current restored, thereby generating a voltage command value based on the difference value.

20. A method for controlling an inverter comprising:

generating a current command value according to a load and calculating a difference value between the current command value and an actual current restored, thereby generating a voltage command value based on the difference value;

generating effective voltage vectors based on the voltage command value;

determining whether the generated effective voltage vectors are located within a low modulation region, and performing a low modulation or a normal modulation for an input voltage according to the determination; and detecting a phase current outputted from an inverter according to the low modulation or the normal modulation, and restoring an actual current from the detected phase current.

21. The method of claim 19, wherein performing the low modulation or the normal modulation includes:

performing the low modulation for an input voltage applied to the inverter when the effective voltage vectors are located within a low modulation region; and performing the normal modulation for the input voltage applied to the inverter when the effective voltage vectors are located within a normal region.

22. The method of claim 21, wherein performing the low modulation includes:

generating a low modulation switching control signal when the effective voltage vectors are located within the low modulation region, and then generating a switching signal for controlling an activation and a low speed driving based on the generated low modulation switching control signal; and switching the inverter by the generated switching signal, and performing the low modulation for the input voltage applied to the inverter according to the result of the switching.

23. The method of claim 22, wherein generating the switching signal includes:
- generating signals for conducting phases synchronized with each other within a half period of a certain time and applying a zero voltage within the rest half period according to the low modulation switching control signal; and
- generating a switching signal by shifting the signal for conducting each of the phases, by a certain level, to the rest half period in which the zero voltage has been applied.

24. The method of claim 21, wherein performing the normal modulation includes:
- generating the normal modulation switching control signal when the effective voltage vectors are located within the normal modulation region, and generating a switching signal for controlling an activation and a low speed driving according to the generated normal modulation switching control signal; and
- switching the inverter by the generated switching signal, and performing the normal modulation for the input voltage applied to the inverter according to the result of the switching.

* * * * *